United States Patent [19]

Rud

[11] Patent Number: 4,477,727
[45] Date of Patent: Oct. 16, 1984

[54] BEAM POSITION DETECTION SYSTEM FOR USE IN AN OPTICAL SCANNING SYSTEM

[75] Inventor: Mayer Rud, Reseda, Calif.

[73] Assignee: The Singer Company, Stamford, Conn.

[21] Appl. No.: 423,773

[22] Filed: Sep. 27, 1982

[51] Int. Cl.³ .......................... G02B 27/17; H01J 3/14
[52] U.S. Cl. ............................... 250/237 G; 250/235; 350/6.5; 355/8; 358/285
[58] Field of Search .................. 250/237 G, 234, 235, 250/236, 237 R; 346/76 L, 108, 160; 350/6.5, 6.6, 6.7, 6.91, 486; 355/8; 356/375; 358/285, 293

[56] References Cited

U.S. PATENT DOCUMENTS

| | | | |
|---|---|---|---|
| 4,178,064 | 12/1979 | Mrdjen | 350/6.6 |
| 4,216,378 | 8/1980 | Monette | 250/235 X |
| 4,256,959 | 3/1981 | Monette | 250/235 |
| 4,279,472 | 7/1981 | Street | 250/235 X |
| 4,424,589 | 1/1984 | Thomas et al. | 358/285 X |

Primary Examiner—Edward P. Westin
Attorney, Agent, or Firm—David L. Davis; Robert E. Smith; Edward L. Bell

[57] ABSTRACT

An incremental optical position sensing system utilizes a single laser beam and an out of focus grating which is between a pair of lenses whose focal planes coincide. The scanning laser beam passes through the first lens, scans the grating, passes through the second lens and impinges upon a pair of sensors. The phase correlation between the signals from the sensors is used to determine the direction of motion of the laser beam and an up/down counter is utilized to accumulate the absolute position of the beam.

9 Claims, 6 Drawing Figures

BEAM POSITION DETECTION SYSTEM FOR USE IN AN OPTICAL SCANNING SYSTEM

DESCRIPTION

BACKGROUND OF THE INVENTION

This invention relates to optical scanning systems utilizing a beam of collimated radiant energy and, more particularly, to a beam position detection system for use therein.

In recent years, optical scanning systems have become widely used, such as in copiers, duplicators, facsimile transmission devices and laser recording and projecting systems, an example of the latter being disclosed in U.S. Pat. No. 4,345,258, which issued to R. C. Tsai and W. J. Kidwell on Aug. 17, 1982. In these scanning systems, a collimated light beam, typically a laser generated beam, is scanned, or deflected, across a surface by means of a galvanometer-mounted mirror. In such a system, it is often necessary to be able to determine the instantaneous position of the beam as it scans the surface. It is therefore a primary object of this invention to provide a beam position detection system for use in an optical scanning system.

One prior approach was to use a pair of beams which are scanned across a grating in synchronism with the main beam. The two beams are focused at the plane of the grating and are separated, at this plane, by a distance equal to ¼ of the grating period. When the main beam is moving in a first direction, one of the two beams will be blocked by the grating first and when the main beam is moving in the opposite direction, the other of the two beams will be blocked by the grating first. The two beams are detected by separate detection elements, for example at different frequencies, and the outputs of the detection elements are interpreted to determine the direction of motion as well as generating counting pulses to provide an incremental distance. While effective, such an approach is difficult and expensive to implement, it requiring two precisely positioned laser beams. Additionally, such a system is susceptible to noise due to deterioration of the grating. It is therefore a further object of this invention to provide a beam position detection system which is relatively inexpensive and simple to implement.

SUMMARY OF THE INVENTION

The foregoing and additional objects are attained in accordance with the principles of this invention by providing a beam position detection system for use in an optical scanning system having a first collimated beam of radiant energy and scanning means for deflecting the first beam along a predetermined path transverse to the first beam. The position detection system comprises a first lens having a first focal length and a second lens having a second focal length. The first and second lenses are positioned such that the optical axes of the lenses coincide and the back focal plane of the first lens and the front focal plane of the second lens coincide. The system further includes means for generating a second collimated beam of radiant energy scanning in synchronism with the first beam and arranged so that the front focal plane of the first lens at the optical axis is at the center of the second beam scanning means. A planar grating member is positioned between the first and second lenses a fixed distance from the coincident back focal plane of the first lens and front focal plane of the second lens, the planar grating member being substantially perpendicular to the optical axis and having a plurality of equi-spaced parallel linear elements substantially perpendicular to the second beam scanning direction. A pair of radiant energy sensitive elements are positioned at the back focal plane of the second lens on opposite sides of the optical axis relative to the second beam scanning direction.

In accordance with an aspect of this invention, the second beam generating means includes means for directing at least a portion of the deflected first beam to the beam position detection system.

In accordance with a further aspect of this invention, the grating member is between the front focal plane of the second lens and the second lens.

In accordance with another aspect of this invention, the radiant energy sensitive elements are each the same distance from the optical axis.

BRIEF DESCRIPTION OF THE DRAWINGS

The foregoing will be more readily apparent upon reading the following description in conjunction with the drawings wherein.

DETAILED DESCRIPTION

Figure 1:
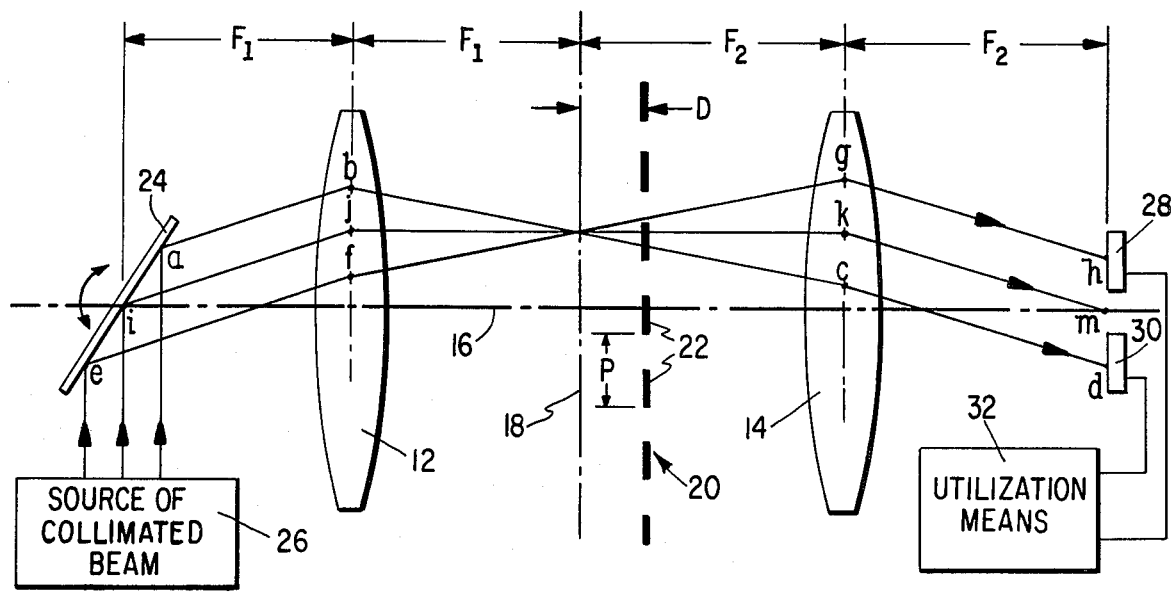
FIG. 1 is a simplified drawing schematically illustrating the elements forming a part of a one dimensional beam position detection system constructed in accordance with the principles of this invention.

Referring now to the drawings, wherein like elements in different figures thereof have the same reference character applied thereto, FIG. 1 schematically illustrates a one dimensional beam position detection system utilizing the principles of this invention. The illustrated system includes a first lens 12 and a second lens 14. For illustrative purposes, the lenses 12 and 14 are shown as being telecentric, but other types of lenses may also be utilized. The lenses 12 and 14 are arranged so their optical axes coincide (along the line 16). The first lens 12 has a focal length $F_1$ and the second lens 14 has a focal length $F_2$. The lenses 12 and 14 are positioned so that the back focal plane of the first lens 12 and the front focal plane of the second lens 14 coincide (along the line 18). The system further includes a planar grating member 20 positioned a distance D from the coincident focal planes 18. As shown in FIG. 1, the grating member 20 has a plurality of equi-spaced parallel linear elements, or bars, 22 which extend perpendicular to the plane of the paper. Preferably, the width of each of the bars 22 equals the space between adjacent bars and the bars 22 have a spacing period designated P, as shown in FIG. 1.

A scanning mechanism 24, illustratively a galvanometer-mounted mirror, is positioned within the entrance pupil of the lens 12 so that its scanning center is at the front focal plane of the first lens 12 at the optical axis (denoted by the letter i). A source 26 provides a collimated beam of radiant energy directed to the scanning mechanism 24. The source 26 may be a laser. The scanning mechanism 24 operates in synchronism with the beam whose position it is desired to detect. (As will be shown with reference to FIG. 3, this beam may be derived by directing a portion of the main beam to the system of FIG. 1). The position detection system also includes a pair of radiant energy sensitive elements 28, 30 positioned at the back focal plane of the second lens 14 on opposite sides of the optical axis 16, relative to the scanning direction. The radiant energy sensitive elements 28, 30 are sensitive to the particular radiant energy of the beam generated by the source 26 and provide output signals to utilization means 32 in response to the impingement thereon of radiant energy to which they are sensitive, as is well known.

As is well known in the art, due to the particular choice of lenses and the positioning thereof, d-h is an image of the entrance pupil a-e. Accordingly, as the scanning mechanism 24 is pivoted about the point i, the collimated beam exiting the second lens 14 will be pivoted about the point m, but will not otherwise travel as the scanning mechanism 24 moves. As a result of the grating member 20 being shifted from the coincident focal plane 18 by a distance D, the ray a-b-c-d is blocked by a bar of the grating 20 while the ray e-f-g-h reaches the sensor 28. As the scanning mechanism 24 pivots in the clockwise direction, both the rays a-b-c-d and e-f-g-h will be blocked by a grating bar and as the scanning mechanism 24 pivots even further, the ray a-b-c-d will reach the sensor 30 while the ray e-f-g-h will be blocked by a grating bar. Further pivoting of the scanning mechanism 24 in the clockwise direction will allow both the rays a-b-c-d and e-f-g-h to reach their respective sensors 30, 28. In order to achieve this result, the distance D by which the grating member 20 is displaced from the coincident focal planes 18 is chosen to be such that a grating bar substantially blocks the entire beam. This distance D may be calculated as $$D = FN \times P/2$$

where P is the period of the grating bars and FN is the f number of the lens 12, which is defined as the ratio of the focal length ($F_1$) of the lens 12 to the entrance pupil of the system. Thus, if the grating member 20 contains 300 line pairs per inch, and if the f number of the lens 12 is equal to 6, then the distance D by which the grating member 20 is displaced from the coincident focal planes 18 may be calculated from the above formula to be 10 mils.

Figure 2A:
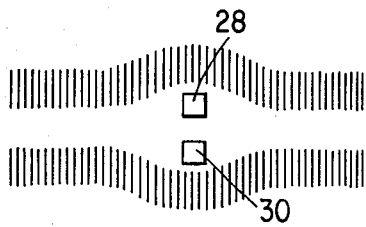
FIGS. 2A, 2B, 2C and 2D schematically illustrate a sequence of energy distribution conditions occurring at the plane of the radiant energy sensitive elements of FIG. 1 as the beam is scanned in a first direction.
Figure 2B:
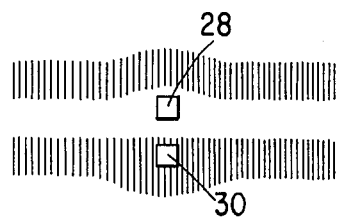
Figure 2C:
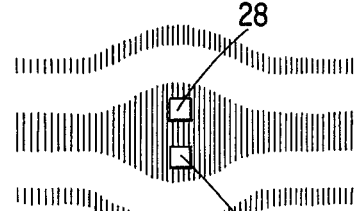
Figure 2D:
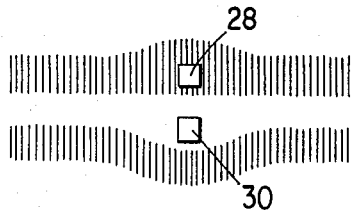

The aforedescribed sequence of light impingement upon the sensor elements 28, 30 is illustrated in FIGS. 2A, 2B, 2C and 2D, where the dark bands represent a blocking of the light. FIGS. 2A-2D represent what would be seen if one were to be looking from the right side of FIG. 1 toward the sensor elements 28, 30, and the dark bands represent the blocking of the collimated beam by the grating bars 22 of the grating member 20. The sequence shown in FIGS. 2A-2D represents the case where the beam is moving downward, i.e., the scanning mechanism 24 is moving in a clockwise direction. The first step, as shown in FIG. 2A, is the case where the beam passes between bars 22 of the grating member 20. Accordingly, both the sensor elements 28, 30 are exposed to radiant energy from the beam. As the beam moves down the grating member 20 due to the clockwise pivoting of the scanning mechanism 24, the sensor 30 is blocked from impinging radiation, as shown in FIG. 2B. Next, as shown in FIG. 2C, both sensor elements 28 and 30 are blocked from having radiation impinging thereon. The final step, as shown in FIG. 2D, is that the sensor element 30 has radiation impinging thereon while the sensor element 28 does not. This sequence repeats itself, with the next step being illustrated in FIG. 2A. The utilization means 32 (FIG. 1), which may be a programmed computer or hard wired circuitry, receives the signals generated by the sensor elements 28, 30 and determines the direction of movement of the beam by examining the phase correlation between the signals from the sensors 28 and 30. Thus, if the signals from the sensors 28 and 30 are digitized into binary form, their outputs represent a two bit Gray code which can be examined to determine the direction of movement of the beam. Additionally, the utilization means 32 can include an up/down counter responsive to signals from the sensor elements 28, 30 and can accumulate the counts to derive the absolute position of the beam.

FIG. 1 shows the case where the grating member 20 is between the coincident focal planes 18 and the second lens 14. The principles of this invention also apply when the grating member 20 is between the first lens 12 and the coincident focal planes 18, the distance from the focal planes 18 being calculated as discussed above. In this latter situation, the sequence of signals from the sensor elements 28, 30 would be opposite to the sequence depicted in FIGS. 2A-2D and the utilization means 32 would have to be arranged accordingly.

The aforedescribed arrangement where the grating member 20 is displaced from the coincident focal planes 18 makes the grating member 20 out of focus so as to greatly reduce the effect of grating deterioration.

Figure 3:
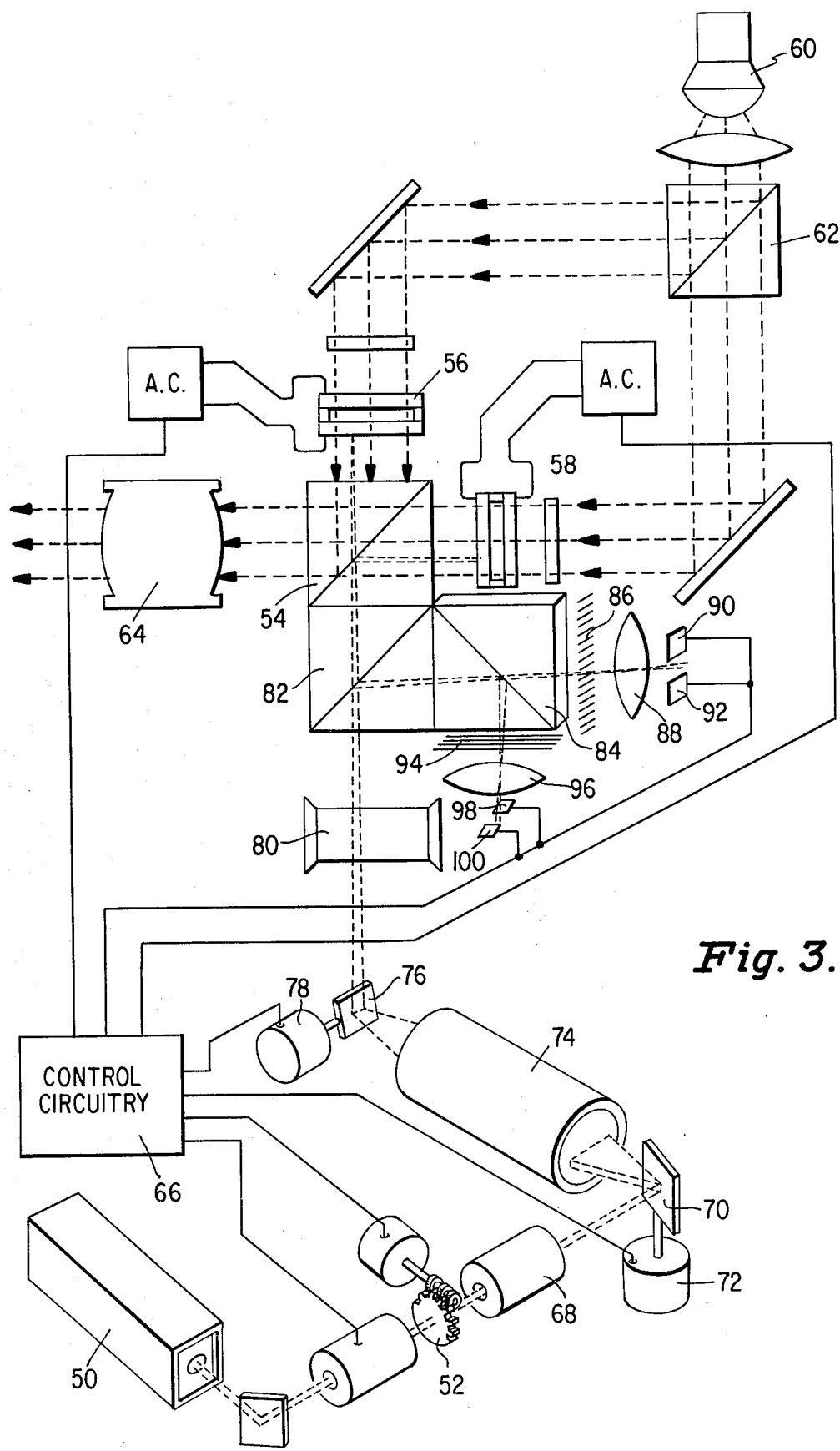
FIG. 3 is a simplified drawing schematically illustrating a beam position detection system constructed in accordance with the principles of this invention and incorporated in an illustrative two dimensional optical scanning system.

The system described with reference to FIG. 1, shows a separate beam source 26. When applied to a practical optical scanning system, it is preferable to generate the detection beam by directing a portion of the main beam to the detection system. This detection beam will then inherently be synchronised with the main beam. A two dimensional scanning system incorporating a detection system such as has been illustrated in FIG. 1, is shown in FIG. 3. The optical scanning system depicted in FIG. 3 is illustrative of the type disclosed in the above-mentioned U.S. Pat. No. 4,345,258, the disclosure of which is hereby incorporated by reference as if fully set forth herein. In summary, the depicted system is a projection and display system which utilizes a modulated laser beam from a laser 50 whose energy distribution in the "P" and "S" polarization planes is controlled by a half wavelength retardation plate 52. The laser beam is then deflected along the X and Y axes and passes through a dichroic polarizer cube 54 which splits the beam to focus upon a P channel smectic liquid crystal display cell 56 and an S channel smectic liquid crystal display cell 58 to selectively form images on one or both of the display cells. At the same time, the formed images are projected by the use of light from the lamp 60 that is split into two colored light beams by a second dichroic cube 62 and is reflected to back light the images in each of the display cells. The projected beams then pass back through the first dichroic cube 54 where they are recombined and passed through a projection lens system 64 to a suitable display screen. To selectively erase the information on either of the display cells 56, 58, an AC bias is applied to that display cell during the laser scan thereof. The aforedescribed operation is under the control of control circuitry 66 which may take the form of a programmed computer.

The scanning is performed by directing the appropriately polarized laser beam, after passing through the retardation plate 52 and a beam expander 68, to a mirror 70 mounted on the X-deflection galvanometer 72 which is under the control of the control circuitry 66 to deflect the laser beam along the horizontal direction as it enters the relay lens 74. The relay lens 74 operates to focus the X-deflected laser beam from the mirror 70 upon the mirror 76 of the Y-deflection galvanometer 78. The scanned laser beam is then focused by a focusing lens 80 before it passes through the dichroic polarizer cube 54.

In accordance with the principles of this invention, after the scanned and focused laser beam passes through the focusing lens 80, and before it reaches the dichroic polarizer cube 36, the laser beam passes through a beam splitter 82 which operates to direct a portion of the scanned laser beam to the beam position detection system. Illustratively, the beam splitter 82 transmits to the dichroic polarizer cube 54 approximately 95% of the laser beam energy and reflects to the beam position detection system the remaining 5% of the laser beam energy. The beam position detection system shown in FIG. 3, utilizes two subsystems each of the type shown in FIG. 1, one for the X-direction and one for the Y-direction. Accordingly, the beam position detection system includes a 50% beam splitter 84 which transmits half of the 5% of the laser energy to the X-direction position detection system and reflects half of the 5% of the laser energy to the Y-direction position detection system. The X-direction position detection system includes a grating member 86, a lens 88 and a pair of sensor elements 90, 92, whose outputs are coupled to the control circuitry 66. Similarly, the Y-direction position detection system includes a grating 94, a lens 96, and a pair of sensor elements 98, 100, the outputs of which are coupled to the control circuitry 66. Each of the lenses 88, 96 corresponds to the second lens 14 shown in FIG. 1, the system focusing lens 80 corresponding to the first lens 12 shown in FIG. 1. Due to the optical properties of the relay lens 74, both the X-deflection mirror 70 and the Y-deflection mirror 76 are optically positioned so that the center of their scanning motion is at the front focal plane of the lens 80. The positioning of each of the grating members 86, 94 and each of the lenses 88, 96, and the sensor elements 90, 92, 98, 100, relative to the focusing lens 80, follow the formula and discussion with respect to the system shown in FIG. 1.

In order to work properly, the laser beam in its "off" state should always be at some residual level which corresponds to the saturation level of the beam sensing elements and circuitry.

Accordingly, there has been disclosed a beam position detection system for use in an optical scanning system which is relatively inexpensive and simple to implement. It is understood that the above-described embodiment is merely illustrative of the application of the principles of this invention. Numerous other embodiments may be devised by those skilled in the art without departing from the spirit and scope of this invention, as defined by the appended claims. Thus, although telecentric lenses have been shown for illustrative purposes, other types of lenses may also be utilized.

I claim:

1. In an optical scanning system having a first collimated beam of radiant energy and scanning means for deflecting said first beam along a predetermined path transverse to said first beam, a beam position detection system comprising:

a first lens having a first focal length;

a second lens having a second focal length, said second lens being positioned such that the optical axes of said first and second lenses coincide and being further positioned such that the back focal plane of said first lens and the front focal plane of said second lens coincide;

means for generating a scanned second collimated beam of radiant energy moving in synchronism with said first beam and arranged so that the center of the second beam scanning means is within the entrance pupil of said first lens;

a planar grating member positioned between said first and second lenses a fixed distance from the coincident back focal plane of said first lens and front focal plane of said second lens, said planar grating member being substantially perpendicular to said optical axis and having a plurality of equi-spaced parallel linear bars substantially perpendicular to the second beam scanning direction;

a pair of radiant energy sensitive elements positioned within the image of said first lens entrance pupil as reimaged by said first and second lenses, said radiant enregy sensitive elements being on opposite sides of said optical axis relative to the second beam scanning direction, each of said radiant energy sensitive elements providing a respective output signal in response to the impingement thereupon of radiant energy from said second beam; and means for utilizing the output signals from said radiant energy sensitive elements to determine the position of said first beam.

2. The system according to claim 1 wherein said second beam generating means includes means for directing at least a portion of the deflected first beam to said beam position detection system.

3. The system according to claim 2 wherein said directing means includes a beam splitter.

4. The system according to claim 1 wherein said grating member is between the front focal plane of said second lens and said second lens.

5. The system according to claim 1 wherein said beam is modulated in intensity and the lowest intensity level of said beam is at least as great as to produce a sensing threshold level for said radiant energy sensitive elements.

6. The system according to claim 1 wherein said fixed distance (D) is given by the equation:

$$D = FN \times P/2$$

where $FN = f$ number of said first lens, and $P = $ period of said grating bars.

7. The system according to claim 1 wherein said radiant energy sensitive elements are each the same distance from said optical axis.

8. The system according to claim 1 wherein said first and second lenses are telecentric.

9. In an optical scanning system including source means for providing a collimated beam of radiant energy, a surface, telecentric lens means for focusing said beam onto said surface, and deflecting means positioned between said source means and said telecentric lens means for scanning said beam in two mutually orthogonal directions across said surface, a beam position detection system comprising:

a first beam splitter positioned between said telecentric lens means and said surface and arranged to direct a portion of said beam away from said surface to said beam position detection system;

a second beam splitter arranged to direct a first part of said beam portion in a first direction and a second part of said beam portion in a second direction;

a first telecentric lens positioned in the path of said beam portion first part and having its front focal plane coincide with the first directed back focal plane of said telecentric lens means, the optical axis of said first telecentric lens coinciding with the first directed optical axis of said telecentric lens means;

a first planar grating member positioned between said second beam splitter and said first telecentric lens a fixed distance from the front focal plane of said first telecentric lens, said first planar grating member having a plurality of equi-spaced parallel linear bars substantially perpendicular to a first of said two scanning directions;

a first pair of radiant energy sensitive elements positioned at the back focal plane of said first telecentric lens on opposite sides of the optical axis of said first telecentric lens relative to said first scanning direction and each providing a respective output signal in response to the impingement thereupon of said beam portion first part;

a second telecentric lens positioned in the path of said beam portion second part and having its front focal plane coincide with the second directed back focal plane of said telecentric lens means, the optical axis of said second telecentric lens coinciding with the second directed optical axis of said telecentric lens means;

a second planar grating member positioned between said second beam splitter and said second telecentric lens a fixed distance from the front focal plane of said second telecentric lens, said second planar grating member having a plurality of equi-spaced parallel linear bars substantially perpendicular to the second of said two scanning directions;

a second pair of radiant energy sensitive elements positioned at the back focal plane of said second telecentric lens on opposite sides of the optical axis of said second telecentric lens relative to said second scanning direction and each providing a respective output signal in response to the impingement thereupon of said beam portion second part; and means for utilizing the output signals from said first and second pairs of radiant energy sensitive elements to determine the position of said beam on said surface.

* * * * *